(12) United States Patent
Albaugh et al.

(10) Patent No.: US 6,912,551 B2
(45) Date of Patent: Jun. 28, 2005

(54) SYSTEM AND METHOD FOR BINDING PROCESSES IN AN E-COMMERCE HUB

(75) Inventors: Virgil A. Albaugh, Austin, TX (US); Philip Yen-tang Chang, Austin, TX (US); Hari Haranath Madduri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 10/015,234

(22) Filed: Dec. 17, 2001

(65) Prior Publication Data

US 2003/0115182 A1 Jun. 19, 2003

(51) Int. Cl.$^7$ ............................................. G06F 17/30
(52) U.S. Cl. ......................... 707/203; 707/10; 709/242
(58) Field of Search .................... 707/1–10, 100–104.1, 707/200–205; 709/242, 205; 705/37

(56) References Cited

U.S. PATENT DOCUMENTS

| | | | |
|---|---|---|---|
| 6,115,690 A | 9/2000 | Wong | 705/7 |
| 6,249,578 B1 | 6/2001 | Gilles et al. | 379/221 |
| 6,282,550 B1 | 8/2001 | Venkatesan et al. | 707/104 |
| 2001/0039570 A1 * | 11/2001 | Stewart et al. | 709/205 |
| 2002/0123957 A1 * | 9/2002 | Notarius et al. | 705/37 |
| 2003/0115129 A1 * | 6/2003 | Feaver et al. | 705/37 |

* cited by examiner

Primary Examiner—Mohammad Ali
(74) Attorney, Agent, or Firm—VanLeeuwen & VanLeeuwen; Joseph T. VanLeeuwen; David A. Mims, Jr.

(57) ABSTRACT

A system and method for binding processes in an e-commerce HUB are present. The e-commerce HUB manages transaction processes between trading partners by tracking document exchange instances and translating documents and business processes as needed. The e-commerce HUB supports multiple connection methods and provides an open forum for small businesses to become trading partners with large businesses without supporting multiple business processes. The e-commerce HUB may allow or restrict e-commerce transactions with other members based on permissions associated with member profiles.

17 Claims, 9 Drawing Sheets

SYSTEM AND METHOD FOR BINDING PROCESSES IN AN E-COMMERCE HUB

BACKGROUND OF THE INVENTION

1. Technical Field

The present invention relates in general to a system and method for binding processes in an e-commerce HUB. More particularly, the present invention relates to a system and method for providing an open platform for e-commerce business transactions and a translation method for document exchange.

2. Description of the Related Art

E-commerce business transactions are conducted by the electronic interchange of business documents. Electronic documents may represent purchase orders, requests for bids, invoices, or an agreed acknowledgement of a receipt. Various standards exist for the definition and exchange of electronic documents. For example, Rosetta Net, cXML, and EDI are industry standards for electronic document exchange. Custom electronic exchange definitions also exist for specific businesses within a particular industry.

The complexity of electronic exchange definitions is increasing to enable trading partners to go beyond the simple exchange of documents. For example, trading partners may collaborate on additional subjects, such as supply chain management. A challenge with existing art is that trading partners pre-agree to a business process and may be confining themselves to a limited set of trading partners.

Applications are available that document, agree, and execute processes on a peer-to-peer basis between trading partners, such as Extricity Alliance and WebMethods. A challenge found with small businesses is they typically do not have the bargaining power to dictate trading processes and may have to support many processes in order to increase access to the market place.

What is needed, therefore, is an e-commerce platform that allows multiple document exchange definitions while providing a message collaboration trail.

SUMMARY

It has been discovered that an intermediary e-commerce HUB provides multiple document exchange definition support while managing message collaboration trails. The e-commerce HUB receives a message from an initiator, assigns the messages to a transaction instance, translates the message, and forwards the translated message to target trading partners.

The HUB receives a message and determines if the message is part of an existing transaction processing instance. If the message is part of an existing transaction processing instance, the HUB verifies that the message is appropriate for the existing processing state. For example, an invoice message should not occur prior to a purchase order message.

Once the HUB verifies the message is appropriate for the existing processing state, the HUB increments the processing state and retrieves profile information corresponding to a first target participant. The profile includes the targeted participants accepted business processes. The HUB formats the message corresponding to the target participant's business processes and sends the formatted message to the target participant. If there are more target participants, the HUB formats and sends the message corresponding to each target participant's profile.

The HUB facilitates business process matching between members by providing document translation (i.e. converting a cXML purchase order to an EDI purchase order) and business process translation (i.e. converting a Rosetta Net Partner Interface Process (PIP) to an EDI process).

The HUB may also be used as a trading partner screening mechanism. A member may specify trading partner qualification criteria or even block messages from a business with which the member has had a previous bad experience.

The HUB may be used as an advertising tool. HUB members may search the member database for potential trading partners that support a specific business process. A potential trading partner may advertise its supported electronic business processes and potentially win business from members searching for potential trading partners.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
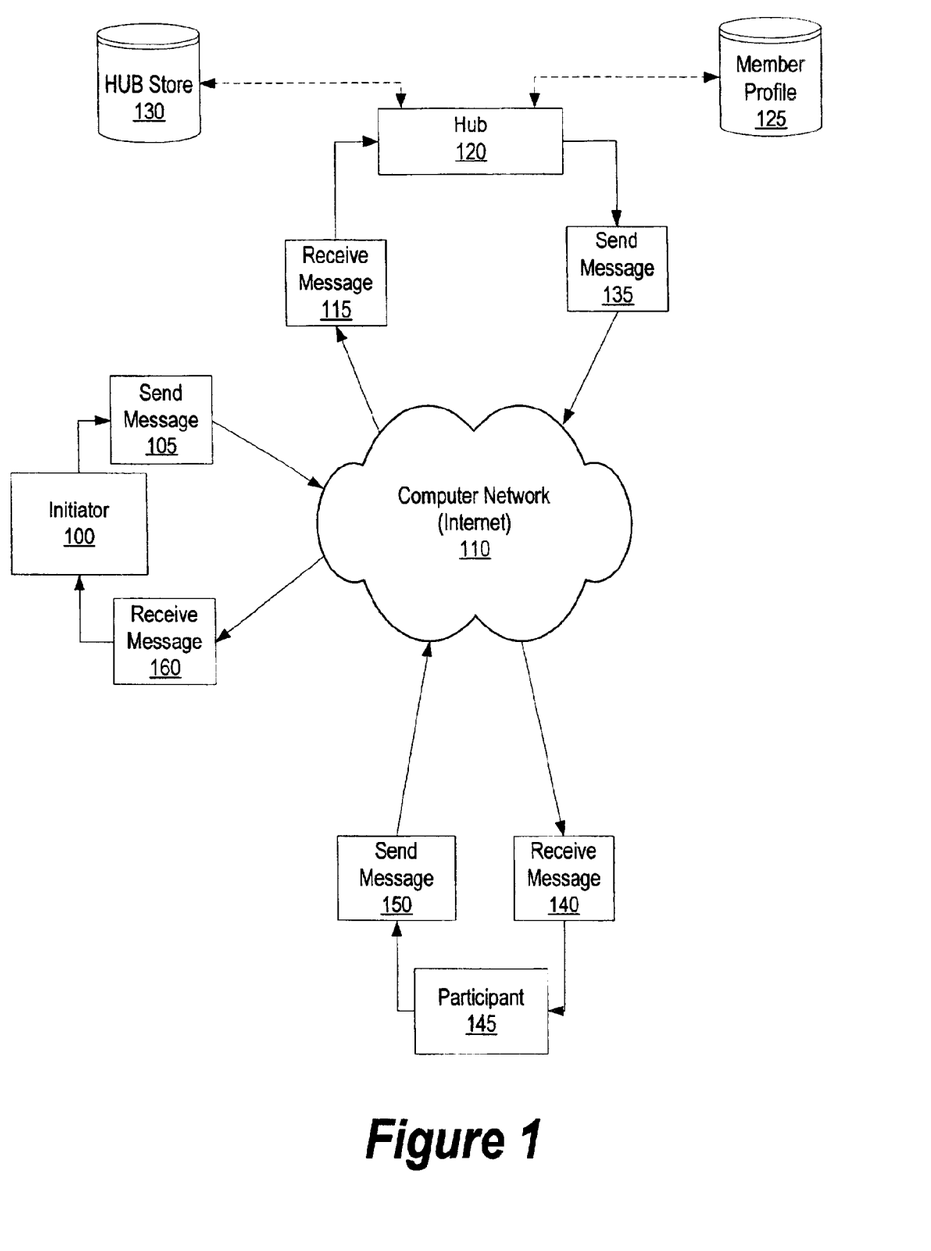
FIG. 1 is a high-level diagram showing an initiator sending a message to a participant through an e-commerce HUB.

FIG. 1 is a high-level diagram showing an initiator sending a message to a responder through an e-commerce HUB. Initiator 100 sends message 105 to HUB 120 through computer network 110, such as the Internet. Computer network forwards message 115 to HUB 120. HUB 120 examines the message to determine if the message is requesting information from the HUB or if the message is to be forwarded to target participants.

If message 115 is requesting HUB information, such as the state of existing transaction instantiations, HUB 120 retrieves the information corresponding to the request from HUB store 130. HUB store 130 may be stored in a non-volatile storage area, such as a computer hard drive. HUB 120 sends message 135 which includes the requested information to computer network 110. Computer network 110 forwards message 160 to initiator 100 to complete the message request response.

If message 115 is to be forwarded to target participants, HUB 120 retrieves information from member profile 125 corresponding to initiator 100 and participant 145. HUB 120 verifies that valid binding transaction processes are in place, and formats the message corresponding to participant 145's business processes. HUB 120 sends formatted message 135 to computer network 110. Computer network 110 forwards message 140 to participant 145. Participant 145 analyzes the message, and sends response 150 to computer network 110. Computer network 110 forwards message 115 to HUB 120 and HUB 120 includes the message in the existing transaction instance. HUB 120 formats the message corresponding to initiator 100's business processes, and sends formatted message 135 to computer network 110. Computer network 110 sends message 160 to initiator 100.

This transaction processing exchange continues until the final transaction corresponding to a transaction instance occurs, such as payment of an invoice. If HUB 120 receives a message not associated with a transaction instance, HUB 120 initiates a new transaction instance making the message the first message in the new instance.

In one embodiment, multiple participants may be recipients of messages and HUB 120 formats each message corresponding to each participant's business processes.

Figure 2:
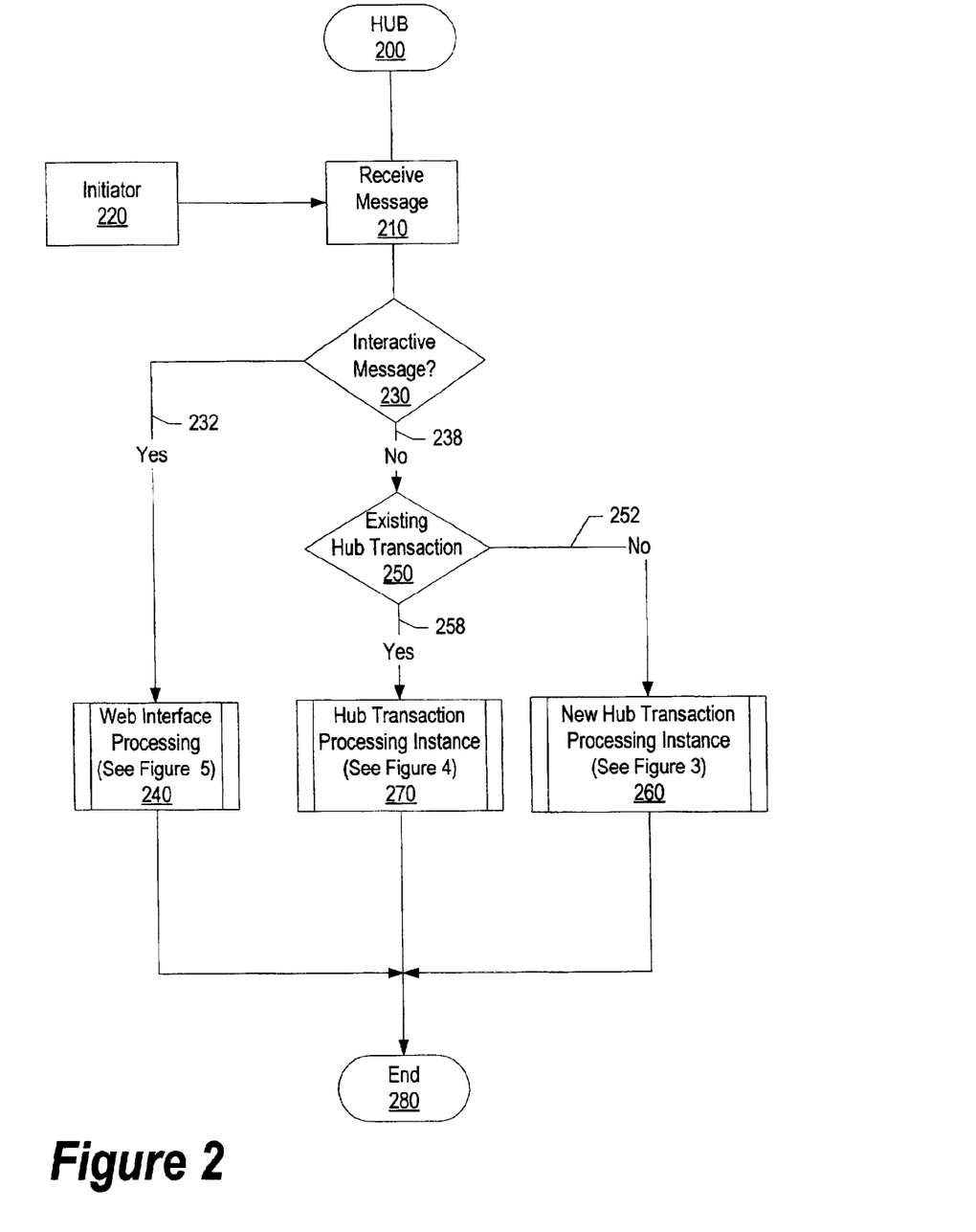
FIG. 2 is a flowchart showing steps taken in processing a message from an initiator.

FIG. 2 is a flowchart showing steps taken in processing a message from an initiator. HUB processing commences at 200, whereupon a message is received from initiator 220 at step 210. A determination is made as to whether the message is from a program or from an interactive web-based interface (decision 230). In one embodiment, a interactive web-based interface message may be an HTTP message with a particular URL destination location. If the message is from an interactive web-based interface, decision 230 branches to "Yes" branch 232 whereupon the message is processes through web interface processing (pre-defined process block 240, see FIG. 5 for further details).

On the other hand, if the message is from a program, decision 230 branches to "No" branch 238. For example, the message may come from a purchasing program that automatically orders supplies. A determination is made as to whether the message is part of an existing transaction instance (step 250). In one embodiment, the message header includes an instance number corresponding to an existing transaction instance. For example, the message may be an invoice in response to a purchase order.

Figure 4:
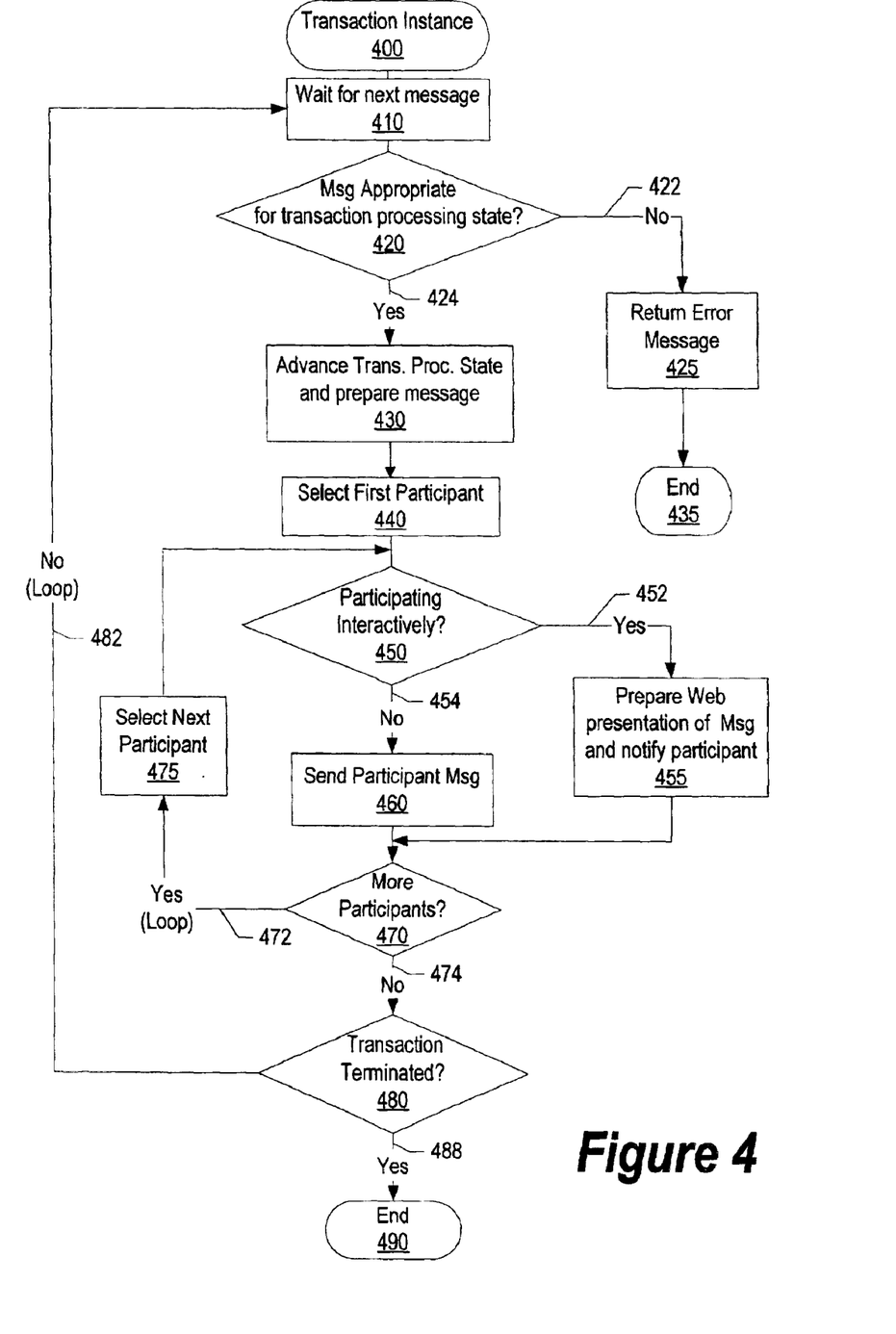
FIG. 4 is a flowchart showing steps taken in processing a message that is part of an existing transaction instance.

If the message is part of an existing HUB transaction instance, decision 250 branches to "Yes" branch 258 whereupon the message is processed corresponding to its instance (pre-defined process block 270, see FIG. 4 for further details).

Figure 3:
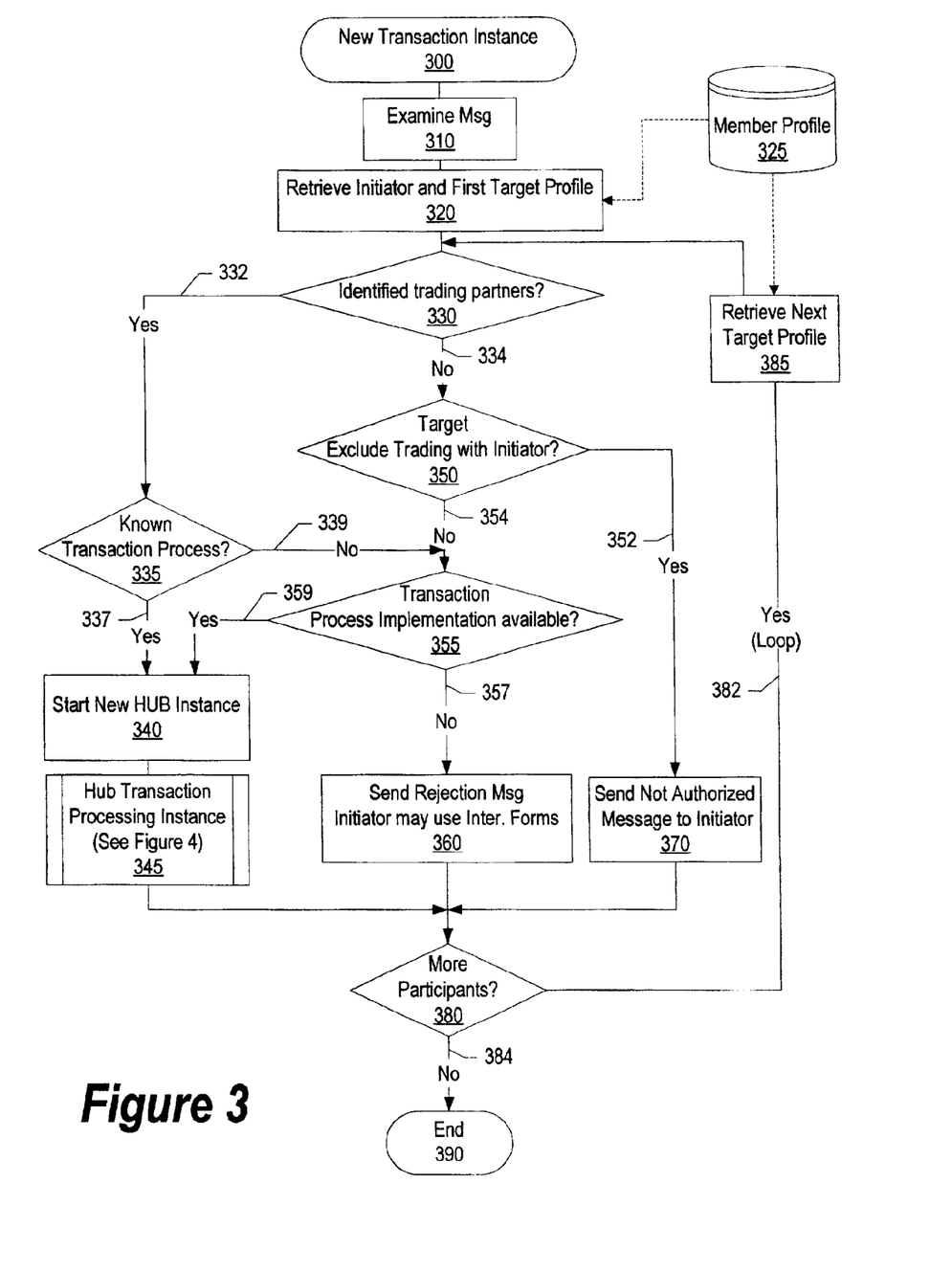
FIG. 3 is a flowchart showing steps taken in processing a new HUB transaction instance.

On the other hand, if the message is not part of an existing HUB transaction instance, decision 250 branches to "No" branch 252 whereupon a new HUB transaction instance is initiated and the message is processed (pre-defined process block 260, see FIG. 3 for further details).

Processing ends at 280.

FIG. 3 is a flowchart showing steps taken in processing a new HUB transaction instance. New transaction instance processing commences at 300, whereupon the received message is examined to establish the message type, the initiator, and the target participants (step 310).

The initiator and first target participant profiles are retrieved from member profile 325 (step 320). A determination is made as to whether the initiator and first target participant are identified trading partners (decision 330). In one embodiment, the target participant's member profile includes trading partners corresponding to the target participant (i.e. meeting the target participants qualifications).

If the initiator and target participant are identified trading partners, decision 330 branches to "Yes" branch 332 whereupon a determination is made as to whether the trading partners have a known transaction process which links, or translates, the initiator's business process to the target participant's process (decision 335). In one embodiment, the target participant's member profile includes the transaction process which links the initiator's business process and the target participant's business process.

If the initiator and target participant do not have a known transaction process, decision 335 branches to "No" branch 339 whereupon a determination is made as to whether the HUB has a transaction processing implementation that binds the initiator's process to the target participant's process (decision 355). If the trading partners have a known transaction process or if there is a transaction processing implementation in place, decision 335 braches to "Yes" branch 337 or decision 355 branches to "Yes" branch 359, respectively, and the message starts a new HUB instantiation using the current message as the first message (step 340). The message is processed using its associated new instance (pre-defined process block 345, see FIG. 4 for further details).

Returning to decision 330, if the initiator and target participant are not identified trading partners, decision 330 branches to "No" branch 334 whereupon a determination is made as to whether the target profile excludes trading with the message initiator (decision 350). For example, the target participant may have had a bad experience with the initiator and does not want to have further business transactions with the initiator. This information is indicated in the target participants profile.

If the target profile excludes trading with the message initiator, decision 350 branches to "Yes" branch 352 whereupon a rejection message is sent informing the initiator that the initiator is not authorized to conduct business with the target participant (step 370).

On the other hand, if the target profile does not exclude trading with the message initiator, decision 350 branches to "No" branch 354 whereupon a determination is made as to whether the HUB has a transaction processing implementation that binds the initiator's process to the target participant's process (decision 355). In one embodiment, a list of binding transaction implementation processes may be stored in a look-up table located in a HUB storage area. For example, a lookup table entry may include binding a Rosetta Net PIP process to an EDI process. If there is a transaction processing implementation in place, decision 355 branches to "Yes" branch 359 and the message starts a new HUB instantiation using the transaction processing implementation.

On the other hand, if there is not a transaction processing implementation in place, decision 355 branches to "No" branch 357 whereupon a message is sent to the initiator that a new HUB transaction processing implementation must be implemented and that the initiator may use interactive forms in the interim (step 360).

A determination is made as to whether there are more target participants of the current message (decision 380). If there are more target participants of the current message, decision 380 branches to "Yes" branch 382 which loops back to select the next target participant profile (step 385), and process the next participant. This looping continues until there are no more target participants of the current message, at which point decision 380 branches to "No" branch 384 and processing ends at 390.

FIG. 4 is a flowchart showing steps taken in processing a message that is part of an existing transaction instance. Transaction instance processing commences at 400, whereupon processing waits for a message (step 410). When a message is received, a determination is made as to whether the message is appropriate for the state of transaction processing (decision 420). In one embodiment, a lookup table stores the current state of a transaction instance and also includes allowable subsequent message types. For example, an invoice message may not arrive before a purchase order message is sent.

If the message is not appropriate for the state of transaction processing, decision 420 branches to "No" branch 422 whereupon a message is prepared informing the message initiator of the error (step 425) and processing ends at 435. On the other hand, if the message is appropriate for the state of transaction processing, decision 420 branches to "Yes" branch 424 whereupon the state of transaction processing is advanced and a message is prepared to inform the trading participants of the advancement (step 430).

The first trading participant is selected from the initiator's member profile at 440, and a determination is made as to whether the participant participates interactively or through programs (decision 450). In one embodiment, the target participant's profile includes information describing how the target participant participates. If the participant participates interactively, decision 450 branches to "Yes" branch 452 whereupon processing generates a web presentation of the message and sends the message to the participant (step 455).

On the other hand, if the participant participates through programs, decision 450 branches to "No" branch 454 whereupon a message is sent to the participant through client-server programming methods (decision 460).

A determination is made as to whether there are more trading participants for the corresponding instance (decision 470). If there are more trading participants, decision 470 branches to "Yes" branch 472 which loops back to select the next participant (step 475) and process the next participant.

This looping continues until there are no more trading participants for the corresponding instance, at which point decision 470 branches to "No" branch 474 whereupon a determination is made as to whether the current message terminates the transaction (decision 480). In one embodiment, a message type may be selected that ends a particular transaction process, such as a confirmation of receipt of payment. Once the transaction is terminated, the transaction history may be stored in a history file for future retrieval.

If the current message does not terminate the transaction, decision 480 branches to "No" branch 482 which loops back to process the next message. This looping continues until the transaction is terminated, at which point decision 480 branches to "Yes" branch 488 and processing ends at 490.

Figure 5:
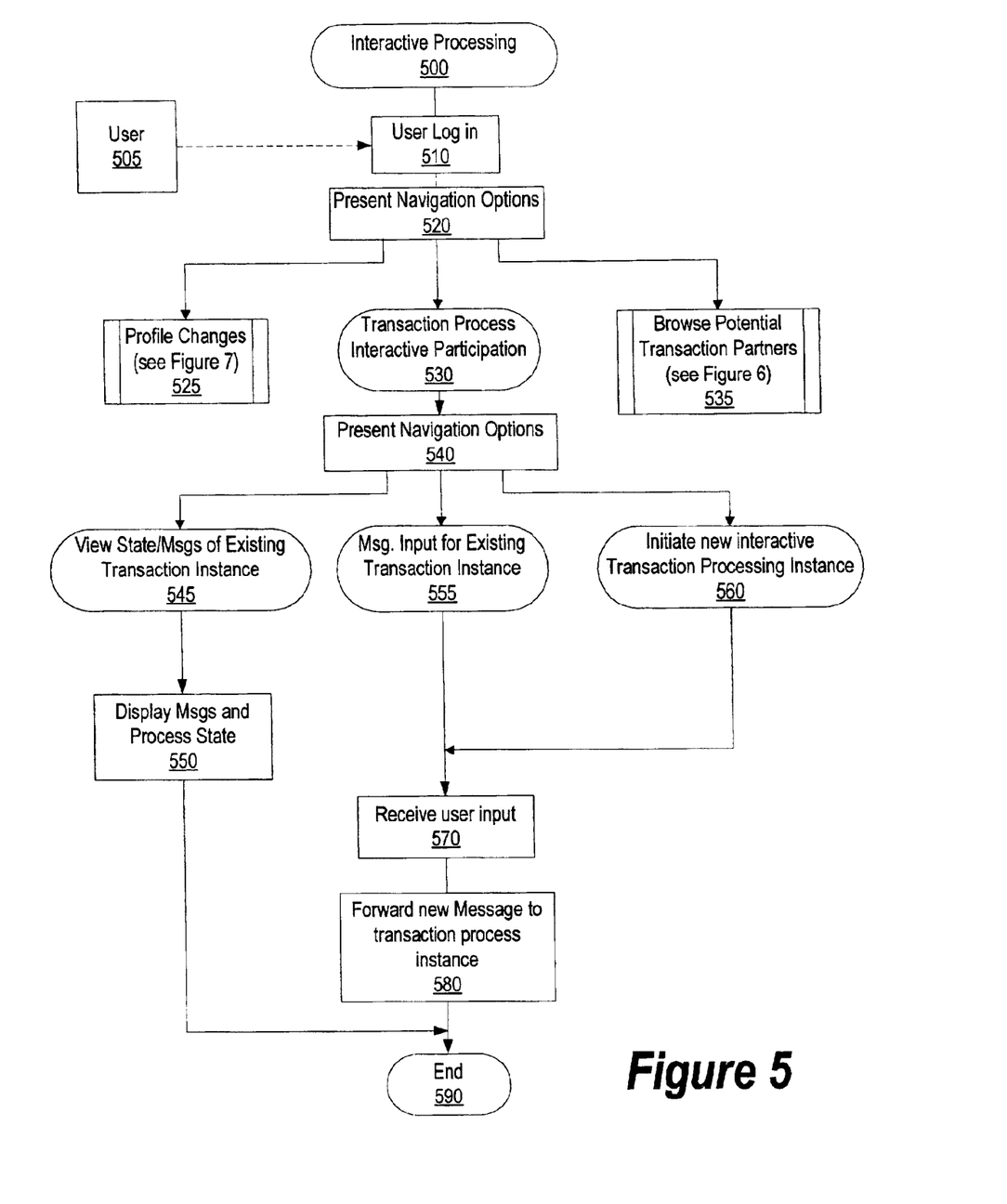
FIG. 5 is a flowchart showing steps taken in processing a message through a web interface.

FIG. 5 is a flowchart showing steps taken in processing a message through a web interface. Web interface processing commences at 500, whereupon login information is retrieved from user 505 (step 510). Navigation options are presented to the user at step 520.

Figure 6:
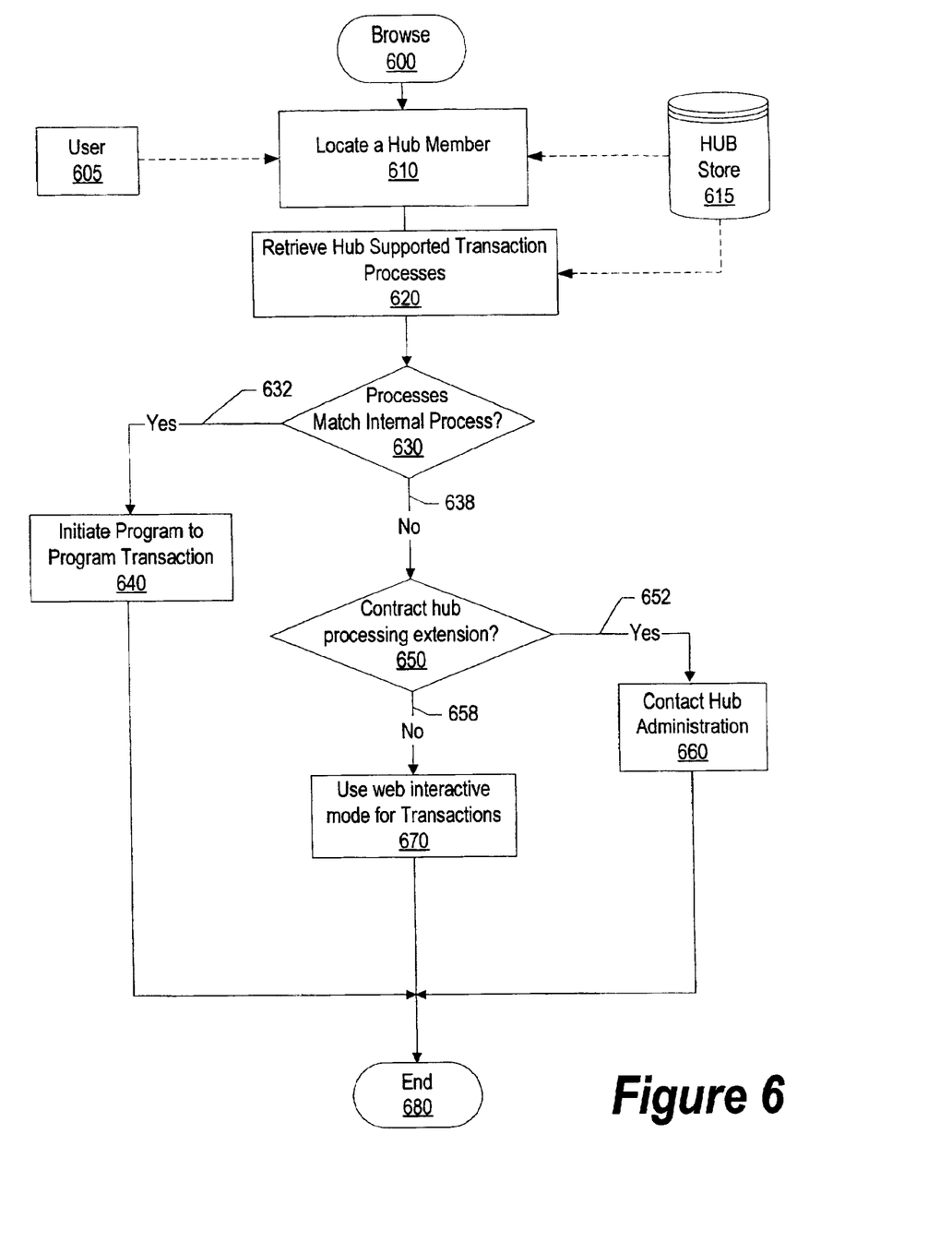
FIG. 6 is a flowchart showing a member searching for compatible trading partners.
Figure 7:
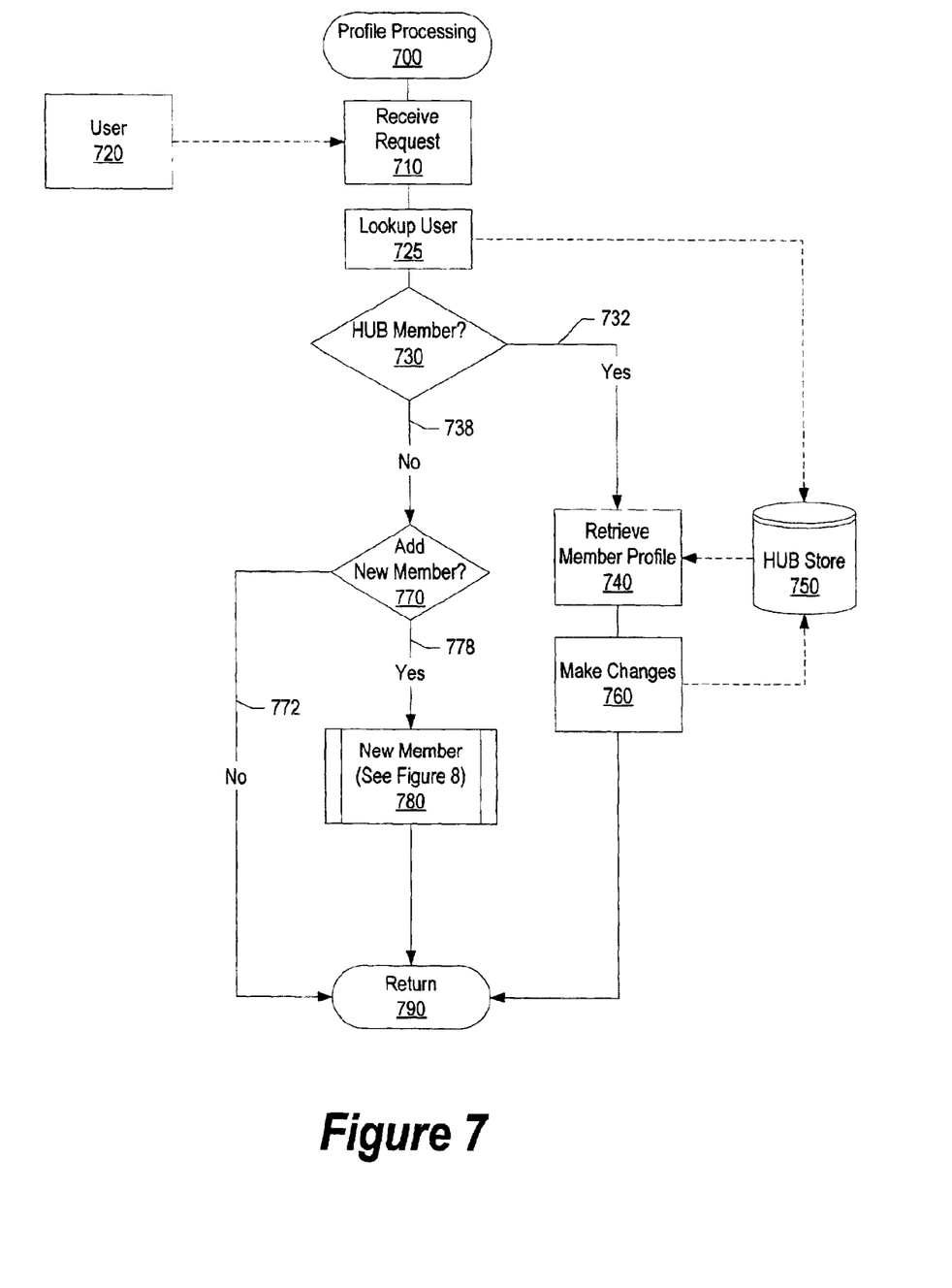
FIG. 7 is a flowchart showing steps taken in processing profile requests.

If the user chooses to change profiles, the user proceeds to profile changes (pre-defined process block 525, see FIG. 7 for further details). If the user chooses to search for potential trading partners, the user proceeds to browsing potential transaction partners (pre-defined process block 535, see FIG. 6 for further details).

If the user chooses to participate in a transaction, the user proceeds to actively participate in the transaction process (step 530). Navigation options are presented to the active participant at step 540.

If the user chooses to view the state or messages of an existing transaction instance, the user proceeds to step 545. In one embodiment, the user enters a user name and password and a list of instances corresponding to the user are retrieved from a HUB storage area. The list of instances may include active instances and terminated instances organized by date, target partners, status, or instance number. The process state and messages are displayed corresponding to the selected instance (step 550).

If the user chooses to input a message corresponding to an existing transaction, the user proceeds to step 555. User input is received at step 570, and forwarded for transaction processing at step 580.

If the user chooses to initiate a new interactive transaction-processing instance, the user proceeds to step 560 and provides a first message input that becomes the first message in the new instance.

Processing ends at 590.

FIG. 6 is a flowchart showing a member searching for compatible trading partners. Browse processing commences at 600, whereupon user 605 locates a prospective trading partner in HUB store 615 (step 610). HUB store 615 may be stored in a non-volatile storage area, such as a computer hard drive. HUB supported transaction processes are retrieved corresponding to the prospective trading partner's business processes (step 620). For example, a HUB supported transaction process may be converting a Rosetta Net PIP to an EDI process.

A determination is made as to whether one of the HUB's supported transaction processes match one of user 605's business processes (decision 630). If one of the HUB processes match one of user 605's processes, decision 630 branches to "Yes" branch 632 whereupon a client-server transaction is initiated between the initiator and the prospective trading partner (step 640). A HUB member may use the HUB as an advertising tool to attract business. For example, the member may advertise its supported business processes in order to be recognized by initiators searching for prospective trading partners.

On the other hand, if a HUB process is not found that match user 605's processes, decision 630 branches to "No" branch 638 whereupon a determination is made as to whether the user wants to contract for a HUB processing extension that bridges the user's processing with the prospective trading partner's business process (decision 650).

If the user decides to contract for a HUB extension, decision 650 branches to "Yes" branch 652 whereupon the user contacts HUB administration to generate the HUB processing extension. For example, the user may have a custom business process and may request the HUB administration to generate a processing extension that translates the user's custom business process in order to correspond with other HUB members. On the other hand, if the user does not want to contract for a HUB extension, decision 658 branches to "No" branch 658 whereupon the user interacts with the prospective trading partner through web based messages (step 670). Processing ends at 680.

FIG. 7 is a flowchart showing steps taken in processing profile requests. Profile processing commences at 700, whereupon a request is received from user 720 (step 710). Processing searches for the user's member profile at step 725 and determination is made as to whether the user is a HUB member (decision 730).

If the user is a HUB member, decision 730 branches to "Yes" branch 732 whereupon the user's profile is retrieved from HUB store 750 (step 740). HUB store 750 may be stored in a non-volatile storage area, such as a computer hard drive. Changes are made corresponding to the user's request at step 760.

On the other hand, if the user is not a HUB member, decision 730 branches to "No" branch 738 whereupon a determination is made as to whether the user wants to be a new member (decision 770).

Figure 8:
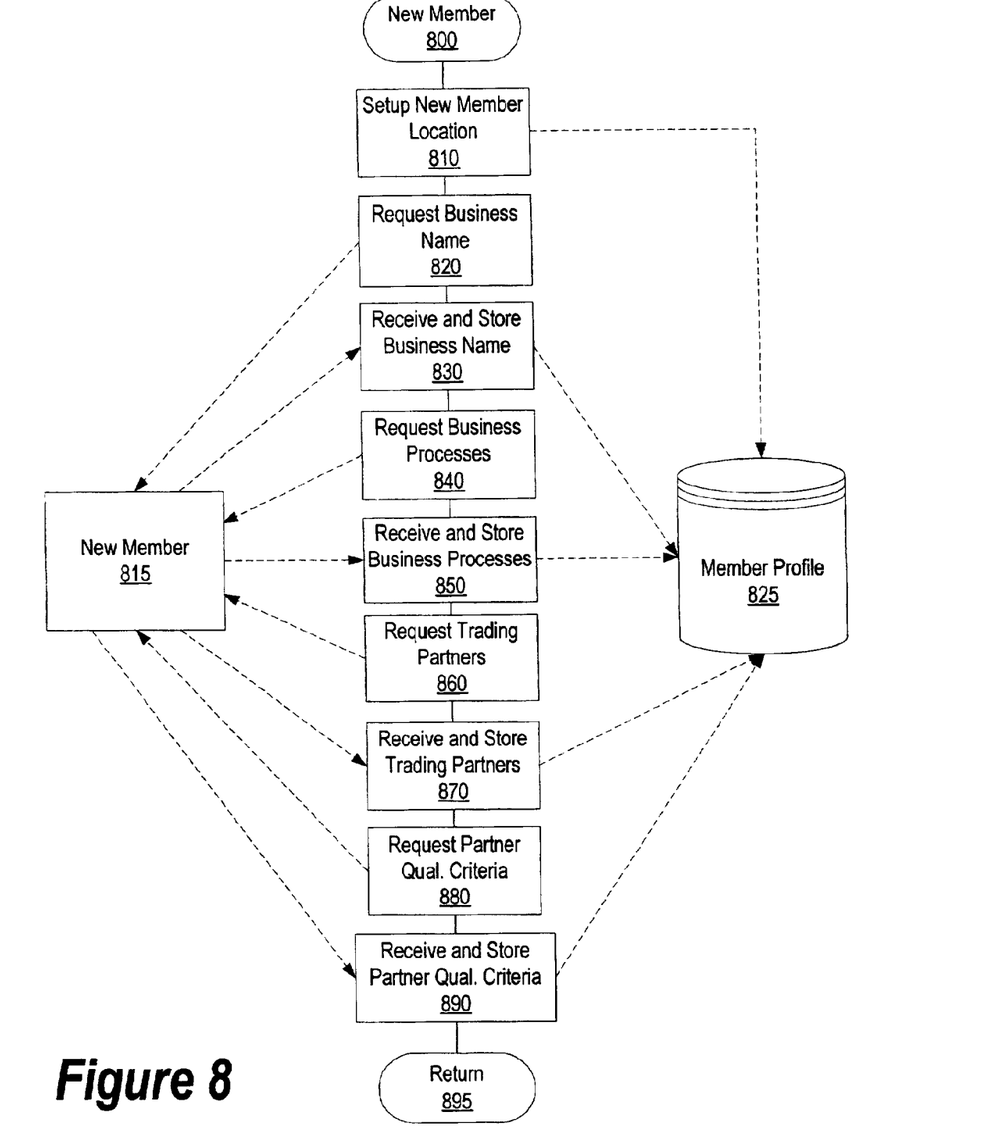
FIG. 8 is a flowchart showing steps taken in configuring a new member profile.

If the user chooses to be a new member, decision 770 branches to "Yes" branch 778 whereupon new member processing takes place (pre-defined process block 780, see FIG. 8 for further details). On the other hand, if the user does not want to be a new member, decision 770 branches to "No" branch 772 bypassing new member processing. Processing returns at 790.

FIG. 8 is a flowchart showing steps taken in configuring a new member profile. New member processing commences at 800, whereupon a new member location is initiated in member profile 825 (step 810). Member profile 825 may be stored in a non-volatile storage area, such as a computer hard drive.

Processing requests a business name from new member 815 at step 820. A business name is received and stored in member profile 825 (step 830). Processing requests preferred business process information from new member 815 at step 840. For example, new member 815 may use EDI to conduct business transactions. The preferred business processes are received and stored in member profile (step 850).

Processing requests preferred trading partners from new member 815 at step 860. Preferred trading partners are received and stored in member profile 825 (step 870). Processing request partner qualification criteria from new member 815 at step 880. For example, new member 815 may wish to conduct business only with six sigma suppliers, or with suppliers that maintain a certain annual revenue level. Trading partner qualification criteria is received and stored in member profile 825 (step 890). Processing ends at 895.

Figure 9:
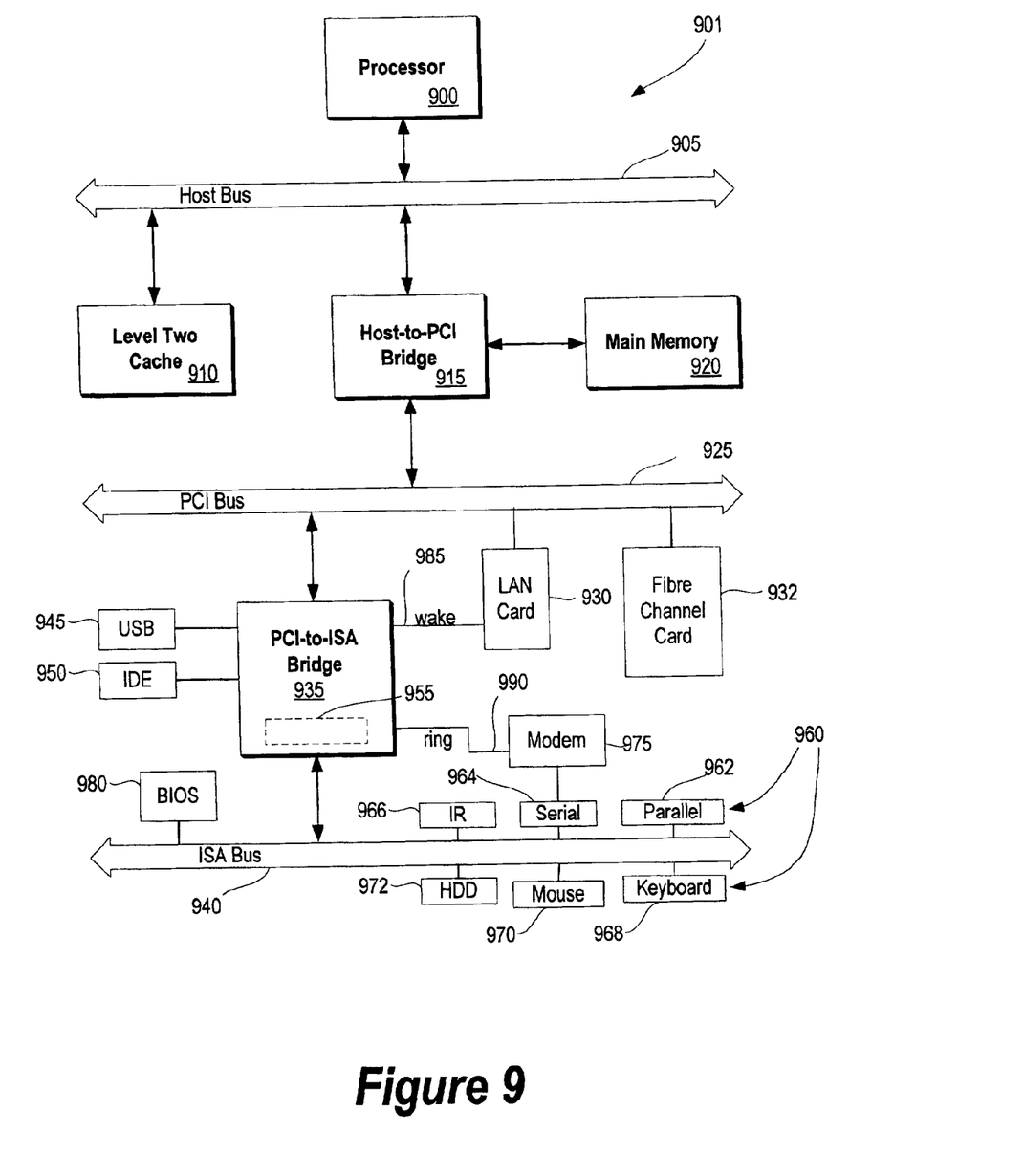
FIG. 9 is a block diagram of an information handling system capable of implementing the present invention.

FIG. 9 illustrates information handling system 901 which is a simplified example of a computer system capable of performing the server and client operations described herein. Computer system 901 includes processor 900 which is coupled to host bus 905. A level two (L2) cache memory 910 is also coupled to the host bus 905. Host-to-PCI bridge 915 is coupled to main memory 920, includes cache memory and main memory control functions, and provides bus control to handle transfers among PCI bus 925, processor 900, L2 cache 910, main memory 920, and host bus 905. PCI bus 925 provides an interface for a variety of devices including, for example, LAN card 930. PCI-to-ISA bridge 935 provides bus control to handle transfers between PCI bus 925 and ISA bus 940, universal serial bus (USB) functionality 945, IDE device functionality 950, power management functionality 955, and can include other functional elements not shown, such as a real-time clock (RTC), DMA control, interrupt support, and system management bus support. Peripheral devices and input/output (I/O) devices can be attached to various interfaces 960 (e.g., parallel interface 962, serial interface 964, infrared (IR) interface 966, keyboard interface 968, mouse interface 970, and fixed disk (HDD) 972) coupled to ISA bus 940. Alternatively, many I/O devices can be accommodated by a super I/O controller (not shown) attached to ISA bus 940.

BIOS 980 is coupled to ISA bus 940, and incorporates the necessary processor executable code for a variety of low-level system functions and system boot functions. BIOS 980 can be stored in any computer readable medium, including magnetic storage media, optical storage media, flash memory, random access memory, read only memory, and communications media conveying signals encoding the instructions (e.g., signals from a network) In order to attach computer system 901 to another computer system to copy files over a network, LAN card 930 is coupled to PCI bus 925 and to PCI-to-ISA bridge 935. Similarly, to connect computer system 901 to an ISP to connect to the Internet using a telephone line connection, modem 975 is connected to serial port 964 and PCI-to-ISA Bridge 935.

While the computer system described in FIG. 9 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of processing electronic document requests, said method comprising:

receiving a request from an initiator transmitted through a computer network;

determining a target recipient;

identifying a first format corresponding to the request;

identifying a second format corresponding to the target recipient, wherein the second format is different than the first format;

dynamically locating a process, wherein the process is adapted to format the request from the first format to the second format;

formatting the request using the located process;

creating a response based on the formatting;

sending the formatted response to the target recipient retrieving a transaction process number and a message process state corresponding to the request;

retrieving a process state corresponding to the transaction process number;

identifying a message type corresponding to the request;

comparing the process state to the message process state; and validating the message in response to the comparison.

2. The method as described in claim 1 further comprising:

retrieving a target profile corresponding to the target recipient, the target profile including a trading partner list and a transaction list;

determining whether the initiator is a trading partner based upon a reading of the trading partner list; and identifying whether the target recipient and initiator have a known transaction process implementation based upon the transaction list.

3. The method as described in claim 2 wherein the target profile includes one or more trading partner qualification criteria.

4. The method as described in claim 2 further comprising:

retrieving a HUB transaction process list;

determining whether a transaction process implementation is available based upon the HUB transaction process list; and sending a message to the initiator based on the determination.

5. The method as described in claim 2 further comprising:

locating an existing instance of the process between the target recipient and the initiator; and creating a new instance between the target recipient and the initiator in response to not locating the existing instance of the process.

6. The method as described in claim 1 wherein the formatting further includes:

determining whether the target recipient uses an interactive process or a client-server process.

7. An information handling system comprising:

one or more processors;

a memory accessible by the processors;

one or more nonvolatile storage devices accessible by the processors;

a document processing tool to process electronic documents, the document processing tool including:

means for receiving a request from an initiator transmitted through a computer network;

means for determining a target recipient;

means for identifying a first format corresponding to the request;

means for identifying a second format corresponding to the target recipient, wherein the second format is different than the first format;

means for dynamically locating a process, wherein the process is adapted to format the request from the first format to the second format;

means for formatting the request using the located process;

means for creating a response based on the formatting;

means for sending the formatted response to the target recipient means for retrieving a transaction process number and a message process state corresponding to the request;

means for retrieving a process state corresponding to the transaction process number;

means for identifying a message type corresponding to the request;

means for comparing the process state to the message process state; and means for validating the message in response to the comparison.

8. The information handling system as described in claim 7 further comprising:

means for retrieving a target profile corresponding to the target recipient, the target profile including a trading partner list and a transaction list;

means for determining whether the initiator is a trading partner based upon a reading of the trading partner list; and means for identifying whether the target recipient and initiator have a known transaction process implementation based upon the transaction list.

9. The information handling system as described in claim 8 wherein the target profile includes one or more trading partner qualification criteria.

10. The information handling system as described in claim 8 further comprising:

means for retrieving a HUB transaction process list;

means for determining whether a transaction process implementation is available based upon the HUB transaction process list; and means for sending a message to the initiator based on the determination.

11. The information handling system as described in claim 8 further comprising:

means for locating an existing instance of the process between the target recipient and the initiator; and means for creating a new instance between the target recipient and the initiator in response to not locating the existing instance of the process.

12. A computer program product stored in a computer operable media for processing electronic documents, said computer program product comprising:

means for receiving a request from an initiator transmitted through a computer network;

means for determining a target recipient;

means for identifying a first format corresponding to the request;

means for identifying a second format corresponding to the target recipient, wherein the second format is different than the first format;

means for dynamically locating a process, wherein the process is adapted to format the request from the first format to the second format;

means for formatting the request using the located process;

means for creating a response based on the formatting;

means for sending the formatted response to the target recipient means for retrieving a transaction process number and a message process state corresponding to the request;

means for retrieving a process state corresponding to the transaction process number;

means for identifying a message type corresponding to the request;

means for comparing the process state to the message process state; and means for validating the message in response to the comparison.

13. The computer program product as described in claim 12 further comprising:

means for retrieving a target profile corresponding to the target recipient, the target profile including a trading partner list and a transaction list;

means for determining whether the initiator is a trading partner based upon a reading of the trading partner list; and means for identifying whether the target recipient and initiator have a known transaction process implementation based upon the transaction list.

14. The computer program product as described in claim 13 wherein the target profile includes one or more trading partner qualification criteria.

15. The computer program product as described in claim 13 further comprising:

means for retrieving a HUB transaction process list;

means for determining whether a transaction process implementation is available based upon the HUB transaction process list; and means for sending a message to the initiator based on the determination.

16. The computer program product as described in claim 13 further comprising:

means for locating an existing instance of the process between the target recipient and the initiator; and means for creating a new instance between the target recipient and the initiator in response to not locating the existing instance of the process.

17. The computer program product as described in claim 12 wherein the formatting further includes:

means for determining whether the target recipient uses an interactive process or a client-server process.

* * * * *